US009716411B2

(12) United States Patent
Tanaka et al.

(10) Patent No.: US 9,716,411 B2
(45) Date of Patent: Jul. 25, 2017

(54) PERMANENT-MAGNET-TYPE ROTATING ELECTRIC MECHANISM (71) Applicant: Mitsubishi Electric Corporation, Chiyoda-ku (JP)

(72) Inventors: Toshinori Tanaka, Chiyoda-ku (JP); Tomoya Tachibana, Chiyoda-ku (JP); Eigo Totoki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 265 days.

(21) Appl. No.: 14/435,647

(22) PCT Filed: Dec. 9, 2013

(86) PCT No.: PCT/JP2013/082949
§ 371 (c)(1),
(2) Date: Apr. 14, 2015

(87) PCT Pub. No.: WO2014/115436
PCT Pub. Date: Jul. 31, 2014

(65) Prior Publication Data
US 2015/0270752 A1    Sep. 24, 2015

(30) Foreign Application Priority Data

Jan. 24, 2013  (JP) ................. 2013-010767

(51) Int. Cl.
*H02K 1/27*  (2006.01)
(52) U.S. Cl.
CPC ......... *H02K 1/2773* (2013.01); *H02K 1/2766* (2013.01); *H02K 2213/03* (2013.01)

(58) Field of Classification Search
CPC  H02K 1/12; H02K 1/27; H02K 1/276; H02K 1/2766; H02K 1/277; H02K 1/2773;
(Continued)

(56) References Cited

U.S. PATENT DOCUMENTS 6,218,753 B1 *  4/2001  Asano ............... H02K 1/276
                                                    310/156.53
7,327,062 B2 *  2/2008  Kaneko .............. H02K 29/03
                                                    310/156.53
(Continued)

FOREIGN PATENT DOCUMENTS

JP  2000 134841  5/2000
JP  2004 173491  6/2004
(Continued)

OTHER PUBLICATIONS

International Search Report Issued Feb. 25, 2014 in PCT/JP13/082949 filed Dec. 9, 2013.

*Primary Examiner* — Tran Nguyen
(74) *Attorney, Agent, or Firm* — Oblon, McClelland, Maier & Neustadt, L.L.P.

(57) ABSTRACT

A rotor core includes low permeability areas having lower permeability than that of a material of the rotor core, between an outer circumference of each magnetic pole and a side surface of each permanent magnet. The low permeability areas are formed asymmetrically with respect to a geometric center of each magnetic pole so that a magnetic center of the magnetic pole is displaced toward one side with respect to the geometric center. The rotor cores are placed upside down relative to each other so that a relative position in the circumferential direction of the low permeability areas with respect to the permanent magnets differs.

8 Claims, 10 Drawing Sheets (58) Field of Classification Search
CPC .. H02K 1/22; H02K 1/24; H02K 1/32; H02K 21/12; H02K 21/14
USPC ........................................ 310/156.53–156.57
See application file for complete search history.

(56) References Cited

U.S. PATENT DOCUMENTS

| | | | |
|---|---|---|---|
| 7,719,153 B2* | 5/2010 | Hsu | H02K 1/2766 310/156.53 |
| 8,102,091 B2* | 1/2012 | Ionel | H02K 1/276 310/156.53 |
| 2004/0095033 A1 | 5/2004 | Popov | |
| 2005/0121990 A1* | 6/2005 | Kaneko | H02K 29/03 310/156.47 |
| 2008/0018190 A1* | 1/2008 | Takahata | H02K 1/2766 310/156.56 |
| 2010/0026128 A1* | 2/2010 | Ionel | H02K 1/276 310/156.53 |
| 2010/0244609 A1 | 9/2010 | Takahata et al. | |
| 2011/0163624 A1* | 7/2011 | Hori | H02K 1/276 310/156.53 |

FOREIGN PATENT DOCUMENTS

| | | | | |
|---|---|---|---|---|
| JP | 2005 176424 | | 6/2005 | |
| JP | 2006166688 A | * | 6/2006 | ............. H02K 1/276 |
| JP | 2008 29095 | | 2/2008 | |

* cited by examiner

FIG. 3A  CORE I

FIG. 3B  CORE II

| —— : COGGING TORQUE WAVEFORM OF ROTOR IN FIG. 5 |
| --- |
| - - - : COGGING TORQUE WAVEFORM OF CORE I ROTOR IN FIG. 3 |
| ....... : COGGING TORQUE WAVEFORM OF CORE II ROTOR IN FIG. 3 |
| ▬▬ : COGGING TORQUE WAVEFORM OF ROTOR HAVING COMBINATION OF CORE I AND CORE II IN FIG. 3 |

FIG. 7A CORE I

FIG. 7B CORE II

NUMBER OF VOIDS FORMING LOW PERMEABILITY AREA 4f

PERMANENT-MAGNET-TYPE ROTATING ELECTRIC MECHANISM

TECHNICAL FIELD

The present invention relates to a permanent-magnet-type rotating electric mechanism of interior magnet type (IPM) having permanent magnets embedded inside a rotor core.

BACKGROUND ART

In rotating electric mechanisms such as industrial or vehicle motors, it is required to realize high torque, low cogging, a wide operation range, and the like. As a technique to meet such requirements, for example, a rotor for a rotating electric mechanism is disclosed which has a rotor core having permanent magnets embedded near the outer circumference thereof and having air gap holes formed at the outer circumference side with respect to the permanent magnets such that the position in the circumferential direction of the air gap holes is different depending on a position in the axial direction. Since the air gap holes are located at positions different in the circumferential direction, the respective cogging torques are cancelled by each other, and thus cogging torque is suppressed (for example, see Patent Document 1).

Another rotating electric mechanism is disclosed which has a plurality of rotor cores each having a permanent magnet insertion hole that is symmetric in the circumferential direction, and having, at both ends of the insertion hole, openings that are asymmetric with each other in the circumferential direction, the plurality of rotor cores being alternately inverted and integrally attached in the axial direction to form a single rotor core (for example, see Patent Document 2).

CITATION LIST

Patent Document

Patent Document 1: Japanese Laid-Open Patent Publication No. 2005-176424 (page 5, FIGS. 5 and 6)
Patent Document 2: Japanese Laid-Open Patent Publication No. 2000-134841 (pages 3 and 4, FIGS. 2 to 4)

SUMMARY OF THE INVENTION

Problems to be Solved by the Invention

In the conventional structure as shown in the above Patent Document 1, air gap holes are provided in a rotor core part to reduce cogging torque. However, such air gap holes provided near a rotor surface hardly exert an effect of reducing q-axis inductance due to q-axis magnetic flux. Therefore, there is a problem that inductance increases as compared to an SPM motor having a surface magnet structure and an operation range is reduced due to constraint of power supply voltage.

Similarly, in the structure as shown in Patent Document 2, the shapes of both ends of the permanent magnet insertion hole are changed in the axial direction, to reduce cogging torque and torque ripple. However, q-axis inductance due to q-axis magnetic flux is hardly reduced. Therefore, particularly, in the case of an IPM motor whose inductance is greater than that of an SPM motor, there is still a problem that an operation range is reduced.

The present invention has been made to solve the above problems, and an object of the present invention is to obtain, particularly, a permanent-magnet-type rotating electric mechanism in which both cogging torque and torque ripple are reduced while q-axis inductance is reduced.

Solution to the Problems

A permanent-magnet-type rotating electric mechanism according to the present invention includes: a stator having stator windings wound on a plurality of tooth portions formed on a stator core; and a rotor having permanent magnets embedded between a plurality of magnetic poles formed along a circumferential direction of a rotor core, the rotor being rotatable integrally with a shaft. The rotor core has a low permeability area having lower permeability than that of a material of the rotor core, between an outer circumference of each magnetic pole and a side surface of each permanent magnet. The low permeability area is formed asymmetrically with respect to a geometric center in the circumferential direction of each magnetic pole so that a magnetic center of the magnetic pole is displaced toward one side with respect to the geometric center. The rotor cores are placed upside down relative to each other so that a relative position in the circumferential direction of the low permeability areas with respect to the permanent magnets differs.

Effect of the Invention

According to the permanent-magnet-type rotating electric mechanism of the present invention, the rotor core has a low permeability area having lower permeability than that of a material of the rotor core, between an outer circumference of each magnetic pole and a side surface of each permanent magnet, the low permeability area is formed asymmetrically with respect to a geometric center in the circumferential direction of each magnetic pole so that the magnetic center of each magnetic pole is displaced toward one side, and the rotor cores are placed upside down relative to each other so that a relative position in the circumferential direction of the low permeability areas with respect to the permanent magnets differs. Therefore, q-axis inductance can be reduced owing to the formation of the low permeability areas, and reduction in an operation range due to constraint of power supply voltage can be suppressed. In addition, since the relative position in the circumferential direction of the low permeability areas differs, phases of cogging torque and torque ripple are shifted, whereby the same effect as in the case of skewing permanent magnets is obtained, and cogging torque and torque ripple can be reduced.

DESCRIPTION OF EMBODIMENTS

Embodiment 1

Figure 1:
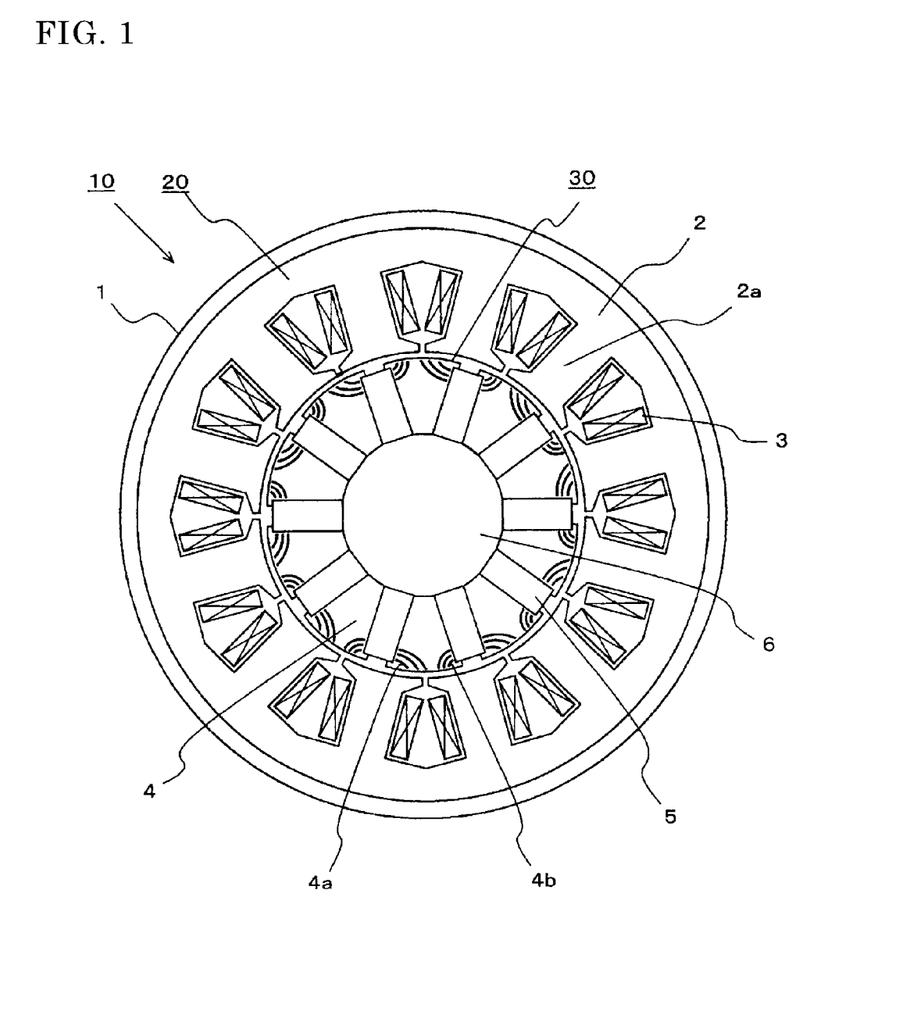
FIG. 1 is a sectional view of a permanent-magnet-type rotating electric mechanism according to embodiment 1 of the present invention, along a direction perpendicular to the axial direction.
Figure 2:
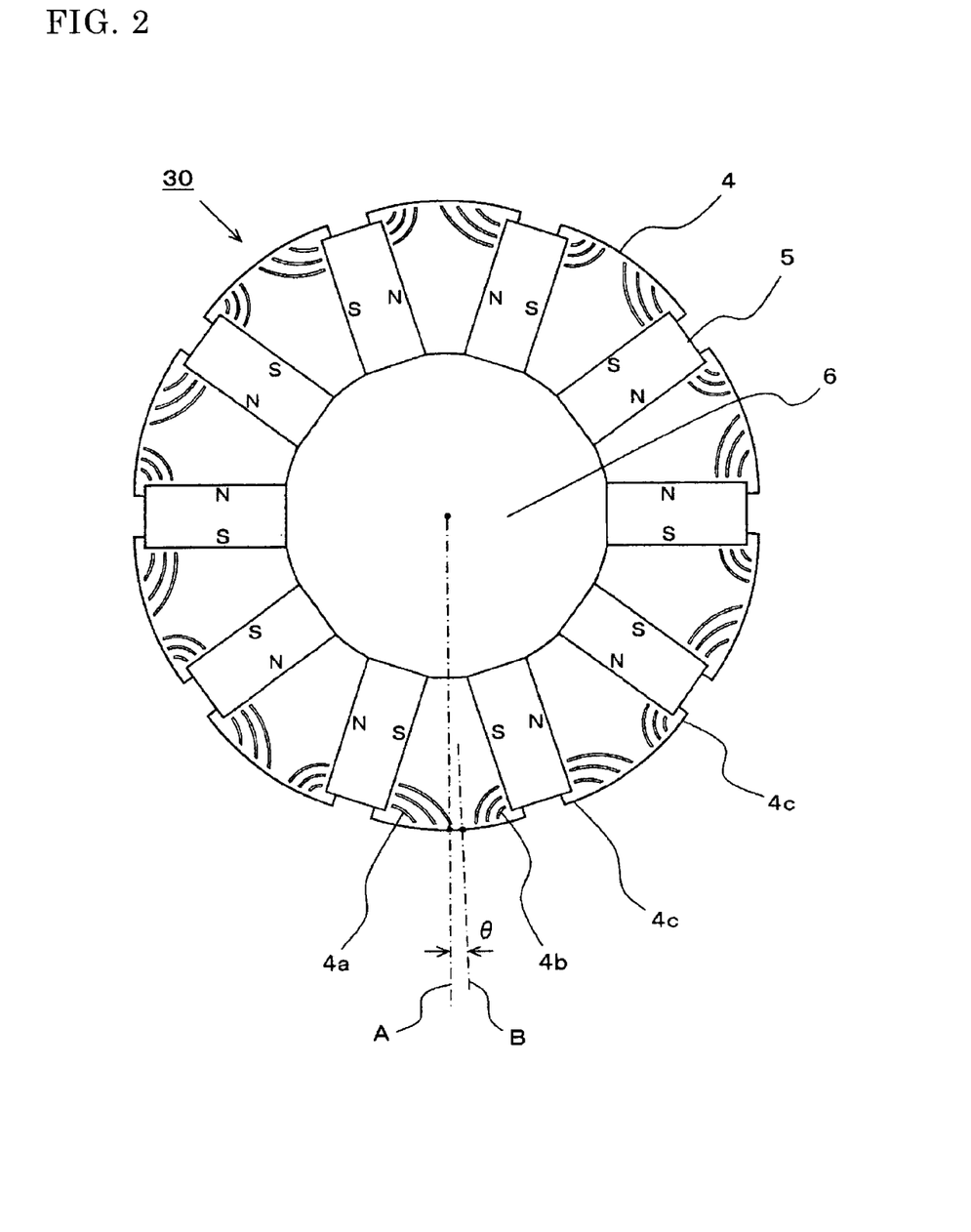
FIG. 2 is a sectional view of a rotor of the permanent-magnet-type rotating electric mechanism in FIG. 1, along a direction perpendicular to the axial direction.

FIG. 1 is a sectional view of a permanent-magnet-type rotating electric mechanism according to embodiment 1 of the present invention, along a direction perpendicular to the axial direction of a rotational shaft. FIG. 2 is a sectional view of a rotor, showing only a rotor part in FIG. 1. In the rotating electric mechanism shown in FIGS. 1 and 2, as an example, the number of teeth of a stator is 12, and the number of magnetic poles of the rotor is 10.

First, with reference to FIG. 1, the summary of the entire structure of the permanent-magnet-type rotating electric mechanism will be described. A permanent-magnet-type rotating electric mechanism 10 has a stator 20 held by an inner wall of a case 1, and a rotor 30 placed via a minute gap inside the stator 20.

The stator 20 has a stator core 2 formed by stacking thin electromagnetic steel sheets having an annular shape, and a stator winding 3 wound via an insulator around twelve tooth portions 2a formed at the inner circumference side of the stator core 2.

On the other hand, the rotor 30 has a rotor core 4 having ten magnetic poles, ten permanent magnets 5 embedded between the magnetic poles of the rotor core 4, and a shaft 6 fixed at the center of the rotor core 4 and having ends supported by bearings (not shown) provided at brackets of the case 1 such that the shaft 6 is rotatable. The permanent magnets 5 have a rectangular sectional shape whose longitudinal direction is directed in a radial direction, and are placed radially from the center side to the outer circumference side of the rotor core 4 and equally along the circumferential direction, as seen from the direction in FIG. 1.

The rotor core 4 has low permeability areas 4a and 4b having lower permeability than that of a material forming the rotor core 4. The details thereof will be described later.

When current is applied to the stator winding 3 to form a rotational magnetic field, the rotor 30 is rotated around the shaft 6.

With reference to FIG. 2, the structure of the rotor 30 will be described in further detail.

The rotor core 4 is formed by multiple thin electromagnetic steel sheets stacked in the axial direction of the rotor 30.

The permanent magnets 5 are embedded across substantially the entire axial length of the rotor core 4, and the magnetization directions thereof are as shown in FIG. 2. In order to prevent each permanent magnet 5 from protruding from the rotor core 4 by centrifugal force when the rotor 30 is rotated, a nail portion 4c to latch the permanent magnet 5 is provided at the outer circumference side of the rotor core 4. Although not shown in FIG. 2, a nonmagnetic material may be provided between the nail portion 4c and the permanent magnet 5. The nonmagnetic material is provided only at the rotor outer circumference side of the permanent magnet 5, and also serves a role of dispersing stress applied from the nail portion 4c to the permanent magnet 5. The permanent magnet 5 and the rotor core 4 may be fixed by an adhesive agent or the like to increase the strength thereof.

In the rotor core 4 in FIG. 2, the magnetic poles are individually formed and then combined with the permanent magnets 5. However, disk-like electromagnetic steel sheets having permanent magnet insertion holes and shaft insertion holes stamped therein may be stacked.

As a feature of the present invention, the rotor core 4 has the low permeability areas 4a and 4b near the outer circumference thereof, which are asymmetric in the circumferential direction in each single pole of the magnetic poles of the rotor core 4.

In each single pole, as seen from the direction in FIG. 2, a center line in the radial direction which connects the center of the outer circumferential length of the fan-like magnetic pole and the center of the shaft 6, that is, a geometric center line of the magnetic pole is denoted by A, and a magnetic center line of the magnetic pole is denoted by B. In this case, the low permeability area 4a and the low permeability area 4b are formed asymmetrically with respect to the center line A such that the center line B is shifted from the center line A by a predetermined angle θ. Thus, the magnetic center (hereinafter, may be simply referred to as a magnetic pole center) which is the center of a magnetic flux passing through the magnetic pole portion is displaced from the center line A. That is, the asymmetric formation of the low permeability areas 4a and 4b displaces the magnetic pole center from the geometric center toward one side in the circumferential direction.

The low permeability areas 4a and 4b are formed by, for example, a plurality of thin voids having an arc shape as shown in FIG. 2. In FIG. 2, the arcs have different lengths to realize the asymmetry.

Figure 3A:
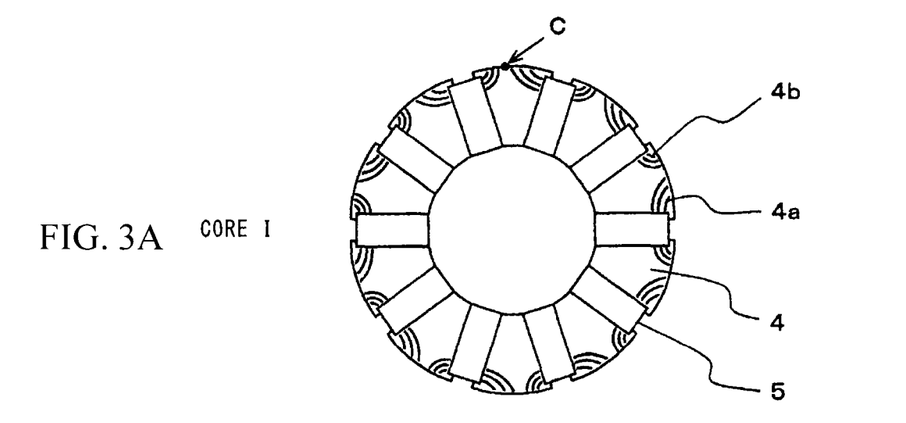
FIGS. 3A, 3B are sectional views of a core I and a core II composing the rotor in FIG. 2.
Figure 3B:
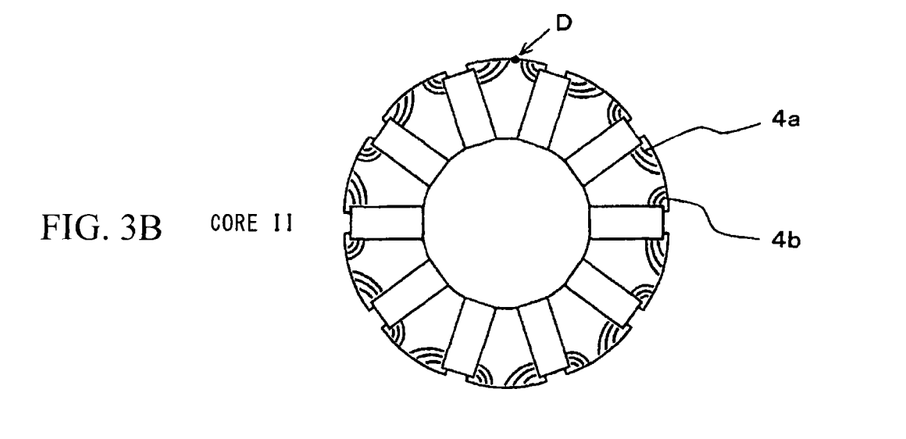
Figure 4:
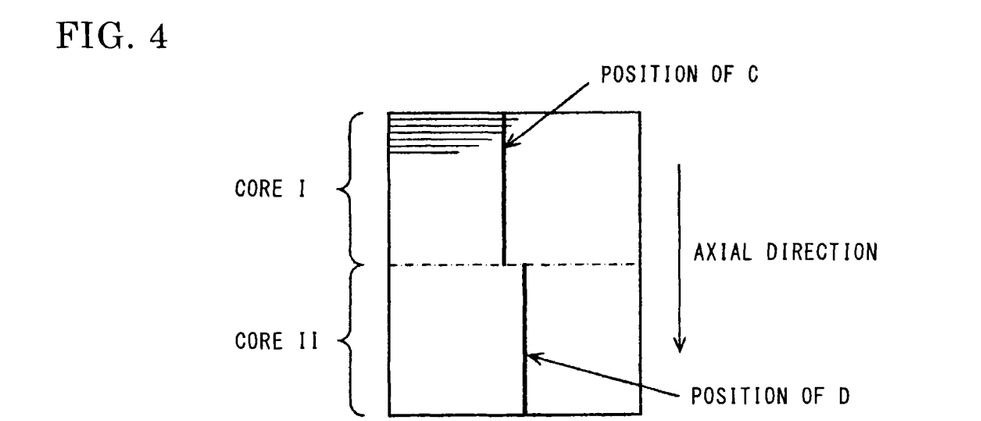
FIG. 4 is a view showing the core I and the core II in FIGS. 3A, 3B which are combined in the axial direction.

The direction of displacement of the asymmetric low permeability areas 4a and 4b is inverted at the middle in the axial direction of the rotor 30 so that the displacement direction is reversed depending on a position in the axial direction of the rotor 30. This will be described with reference to FIGS. 3A, 3B and FIG. 4. FIGS. 3A, 3B are a sectional views of the rotor core 4 as seen from the axial direction. FIG. 4 is a plan view of the rotor core 4 as seen from a direction perpendicular to the axial direction. In FIG. 4, the permanent magnets 5 are not shown.

In FIGS. 3A, 3B, a core I in (a) has the same shape of the rotor core 4 shown in FIG. 2, and a core II in (b) has the low permeability area 4a and the low permeability area 4b reversed in the circumferential direction as compared to the core I. That is, the relative position in the circumferential direction of the low permeability areas 4a and 4b with respect to the permanent magnets 5 differs between (a) and (B). Actually, the core II is obtained by turning the core I upside down.

That is, in manufacturing of the rotor, the core I and the core II are manufactured with the same die. For example, if the surface seen in (a) is assumed as a front surface, the core I is formed by a plurality of electromagnetic steel sheets overlaid with their front surfaces facing upward, and the core II is formed by a plurality of electromagnetic steel sheets overlaid with their back surfaces facing upward. Therefore, since the same die can be used, the manufacturing cost can be reduced.

Blocks of the core I and the core II shown in FIGS. 3A, 3B which are respectively stacked to the same height are combined to form the entirety such that a half in the axial direction of the rotor 30 corresponds to the core I block and the other half corresponds to the core II block, as shown in FIG. 4.

Here, while the geometric center line of the core is denoted by A and the magnetic center line of each magnetic pole is denoted by B as shown in FIG. 2, in FIGS. 3A, 3B, an intersection of the line B and the core outer circumference is referred to as a point C in the core I and referred to as a point D in the core II. In this case, as shown in FIG. 4, in the axial direction, the point C and the point D are shifted from each other. In addition, in the core I region, the point C continuously appears at the same position along the axial direction, and similarly, in the core II region, the point D continuously appears at the same position along the axial direction.

Figure 5:
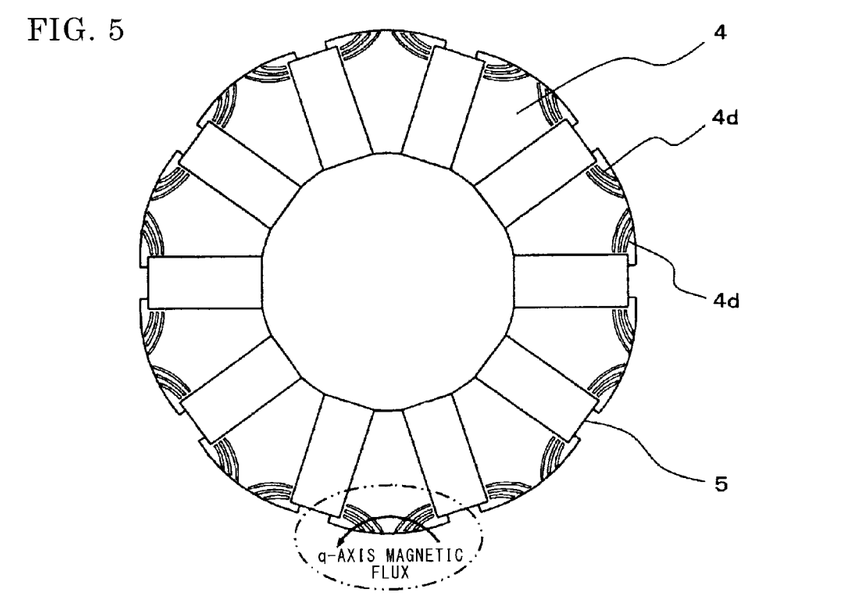
FIG. 5 is a sectional view of a rotor of a permanent-magnet-type rotating electric mechanism along a direction perpendicular to the axial direction, as a comparison example.

FIG. 5 is a sectional view of a rotor of a permanent-magnet-type rotating electric mechanism, showing a comparison example for explaining operation and effect of the present invention. The number of magnetic poles of the rotor is 10 as in FIG. 2, and low permeability areas 4d are formed symmetrically in each single pole of the rotor core 4. That is, the geometric center and the magnetic center of each magnetic pole coincide with each other.

In the case where a magnetic flux axis of the rotor core 4 is defined as d axis and an axis orthogonal to the d axis in terms of electric angle is defined as q axis, a q-axis magnetic flux is representatively shown in a two-dotted dashed line part in FIG. 5. The low permeability areas 4d formed in the rotor core 4 as shown in FIG. 5 block flow of the q-axis magnetic flux, thereby reducing q-axis inductance. The same holds true for the case where the low permeability areas 4a and 4b are asymmetrically formed in each single pole of the rotor core as in the core I and the core II shown in FIG. 3 of the present invention, and q-axis inductance can be reduced.

Next, operation and effect of the present invention will be described with reference to FIG. 6.

Figure 6:
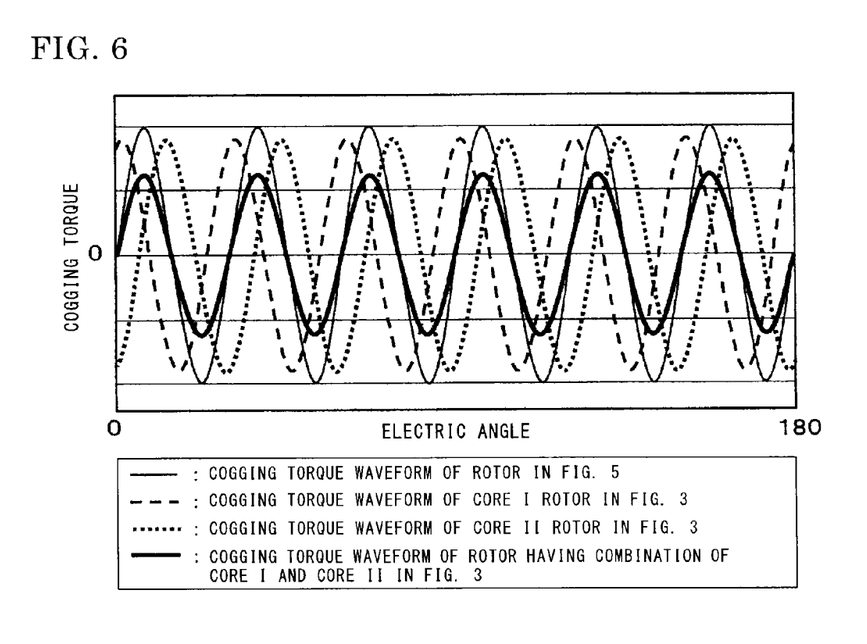
FIG. 6 is a waveform diagram of cogging torques in the case of using rotor cores shown in FIGS. 3A, 3B and FIG. 5.

FIG. 6 is a diagram showing waveforms of cogging torques occurring when the rotor of the comparison example shown in FIG. 5 and the rotor 30 of the present invention shown in FIG. 4 which has a combination of the core I and the core II shown in FIGS. 3A, 3B are rotated, in the case where the number of teeth of the stator 20 is 12 as shown in FIG. 1.

Waveforms of cogging torques occurring at the core I and the core II in the rotor 30 of the present invention have phases shifted from a waveform (shown by thin solid line) of cogging torque in the rotor having the low permeability areas 4d formed symmetrically in each single pole as shown in FIG. 5. That is, a waveform shown by a dashed line occurs in the core I, and a waveform shown by a dotted line occurs in the core II. As a result, in the rotor 30 of the present invention having the core I and the core II combined in the axial direction as shown in FIG. 4, both waveforms are synthesized to become a waveform shown by a thick solid line in FIG. 6, and it is found that cogging torque is reduced as compared to the rotor in FIG. 5.

In addition, as described above, since q-axis inductance can be reduced owing to the formation of the low permeability areas 4a and 4b in the rotor core 4, reduction in an operation range due to constraint of power supply voltage can be suppressed, and for example, a rotation rate region in which operation can be performed with constant torque can be expanded.

In FIG. 1, the number of teeth of the stator is 12, and the number of magnetic poles of the rotor is 10. However, the number of teeth of the stator and the number of magnetic poles of the rotor are not limited to those in FIG. 1. The same effect can be obtained even by a rotating electric mechanism with another combination of the number of teeth and the number of magnetic poles.

In the above description, the low permeability areas in the rotor core are formed by a plurality of arc-shaped voids. However, for example, the low permeability areas may be formed by deformation in the thickness direction to cause magnetic deterioration, and the shapes thereof are not particularly limited. However, the low permeability areas formed by a plurality of arc-shaped voids between the outer circumference of the magnetic poles and side surfaces of the permanent magnets can reduce inductance most effectively.

In the rotor described above, the two areas of low permeability areas 4a and 4b are formed asymmetrically with respect to the geometric center line A of each magnetic pole, whereby the magnetic center of the magnetic pole is displaced toward one side with respect to the geometric center. Next, modifications thereof will be described.

Figure 7A:
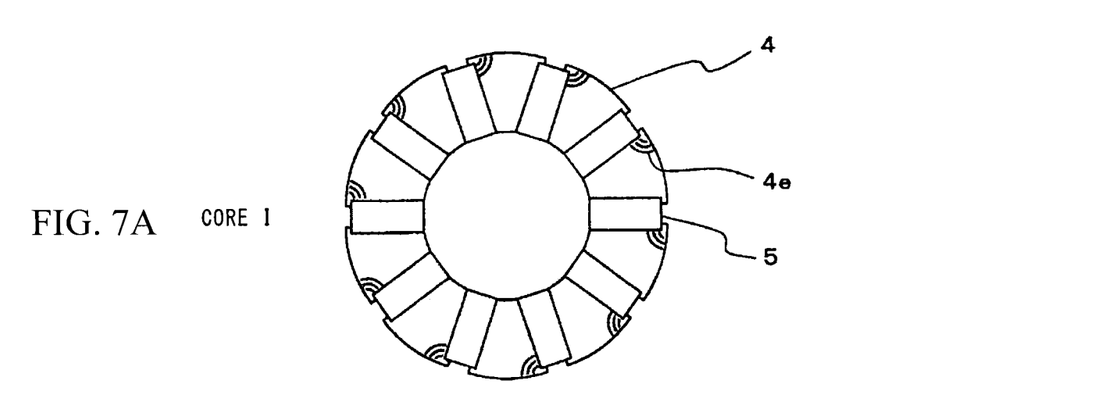
FIGS. 7A, 7B are sectional views showing another example of the core I and the core II of the rotor of the permanent-magnet-type rotating electric mechanism according to embodiment 1 of the present invention.
Figure 7B:
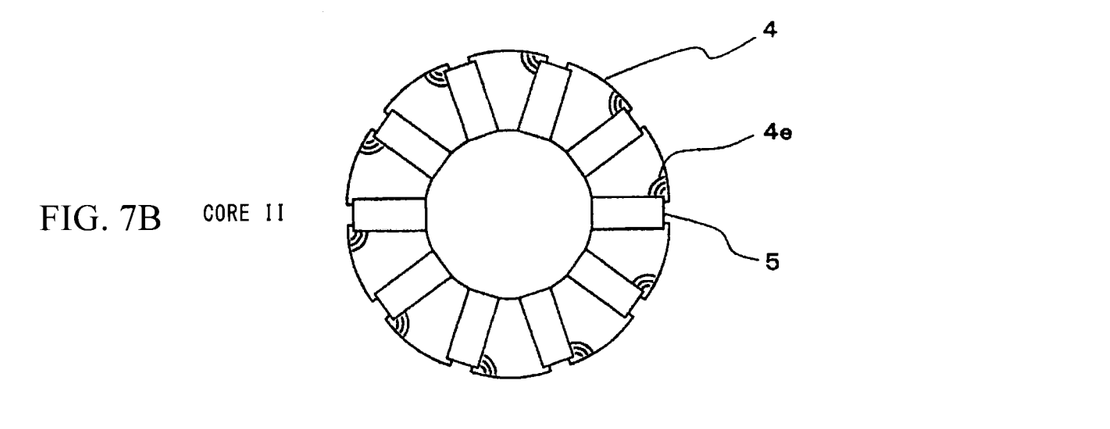
Figure 8:
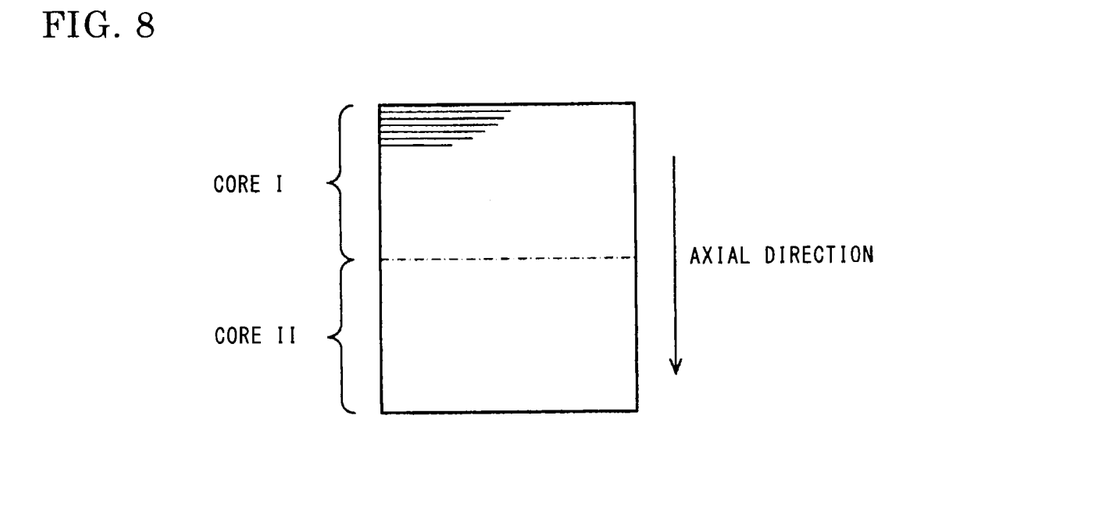
FIG. 8 is a view of the core I and the core II in FIGS. 7A, 7B which are combined in the axial direction.

FIGS. 7A, 7B are sectional views along a direction perpendicular to the axial direction, showing another example of the core I and the core II of the rotor of the permanent-magnet-type rotating electric mechanism. FIG. 8 is a view of the core I and the core II shown in FIGS. 7A, 7B which are combined in the axial direction. A difference from FIGS. 3A, 3B is that a low permeability area 4e is formed, near the outer circumference of the rotor core 4, at only one side in the circumferential direction of each single pole of the rotor core 4.

As shown in FIGS. 7A, 7B, the low permeability area 4e is formed between the outer circumference of each magnetic pole of the rotor core 4 and a side surface of one of the permanent magnets 5 placed at both sides of the magnetic pole. The low permeability area 4e in the core II of (b) is formed at the opposite side in the circumferential direction relative to that in the core I of (a). Actually, the core II is obtained by turning the core I upside down. Therefore, the core II may be manufactured by stamping with the same die.

Blocks of the core I and the core II shown in FIGS. 7A, 7B are combined at the middle position in the axial direction of the rotor core 4, so as to be integrated, as shown in FIG. 8.

The same operation and effect as in FIGS. 3A, 3B can be obtained even by such a structure. If the low permeability areas of the rotor core 4 are increased, the strength of the rotor core 4 is weakened. However, since the low permeability areas 4e are formed only at one side, as compared to the case of FIGS. 3A, 3B, the strength of the entire rotor core 4 is increased, and therefore the rotation rate of the rotor can be increased.

Figure 9:
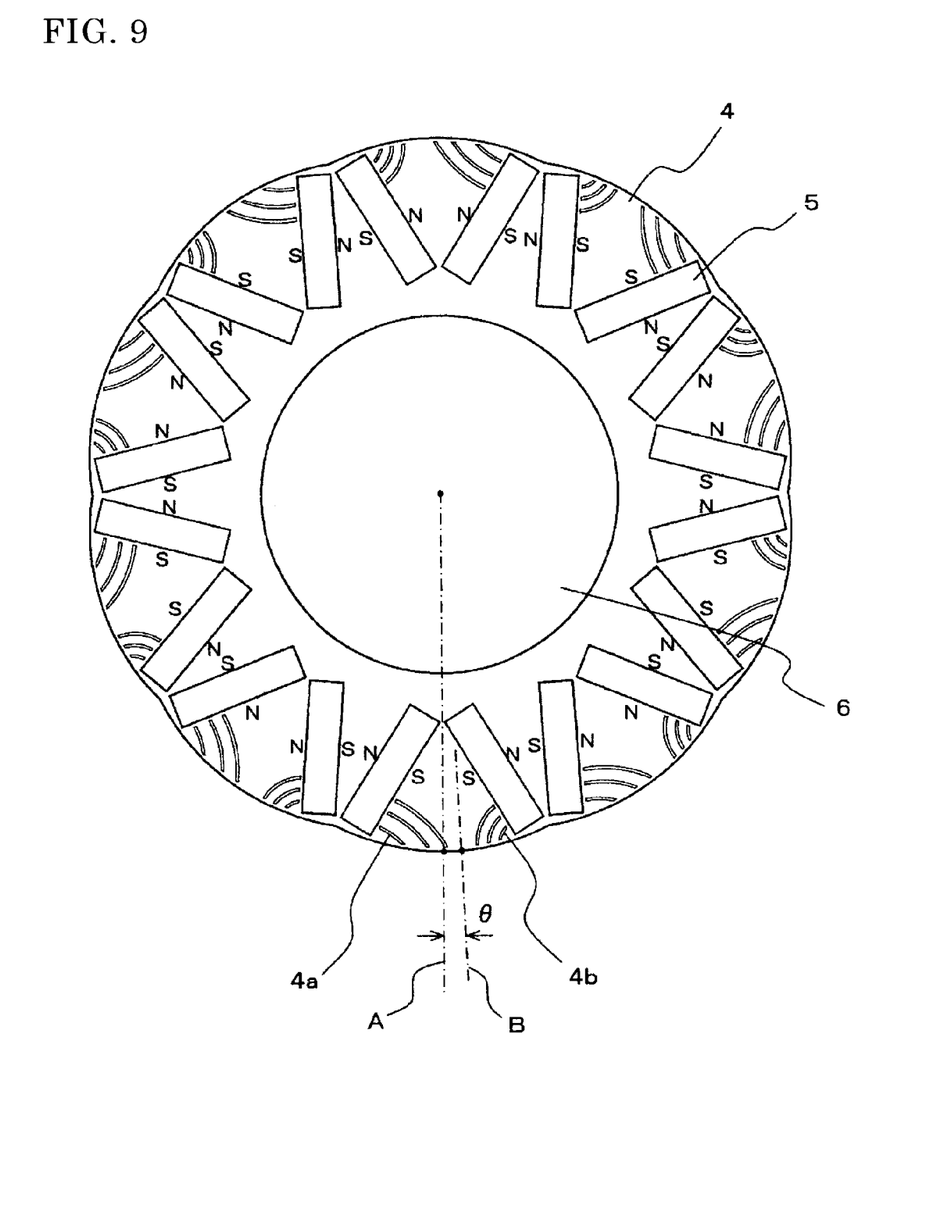
FIG. 9 is a sectional view along a direction perpendicular to the axial direction, showing still another example of the rotor of the permanent-magnet-type rotating electric mechanism according to embodiment 1 of the present invention.

FIG. 9 is a sectional view along a direction perpendicular to the axial direction, showing still another modification example of the rotor of the permanent-magnet-type rotating electric mechanism. In the above description, the permanent magnets 5 are placed radially. In the present example, two permanent magnets 5 are provided per one pole of the rotor core 4. The two permanent magnets 5 are placed so as to spread in V shape from the center side toward the outer circumference side of the rotor core 4. The magnetization directions of the permanent magnets 5 are as shown by N and S in FIG. 9.

As in the case of FIG. 2, a center line in the radial direction which connects the center in the outer circumferential direction of the fan-like magnetic pole and the center of the shaft 6, that is, a geometric center line of the magnetic pole is denoted by A, and a magnetic center line of the magnetic pole is denoted by B. In this case, the low permeability area 4a and the low permeability area 4b are formed asymmetrically with respect to the center line A such that the center line B is shifted from the center line A by a predetermined angle θ. Thus, the magnetic pole center is displaced. In addition, as in the case of FIG. 4, the displacement direction is inverted at the middle in the axial direction of the rotor.

The same operation and effect as in the above can be obtained even by the permanent-magnet-type rotating electric mechanism configured as shown in FIG. 9. In addition, the permanent-magnet-type rotating electric mechanism configured as shown in FIG. 9 is also applicable to the later-described embodiments other than embodiment 1.

Next, the number of voids in the case where the low permeability areas are formed by thin voids will be described. For example, the low permeability areas can be changed by changing the length of each void, increasing the number of the voids, or changing the area of each void. Among these methods, changing the number of the plurality of voids is effective also in terms of harmonic suppression, as described below.

Figure 10:
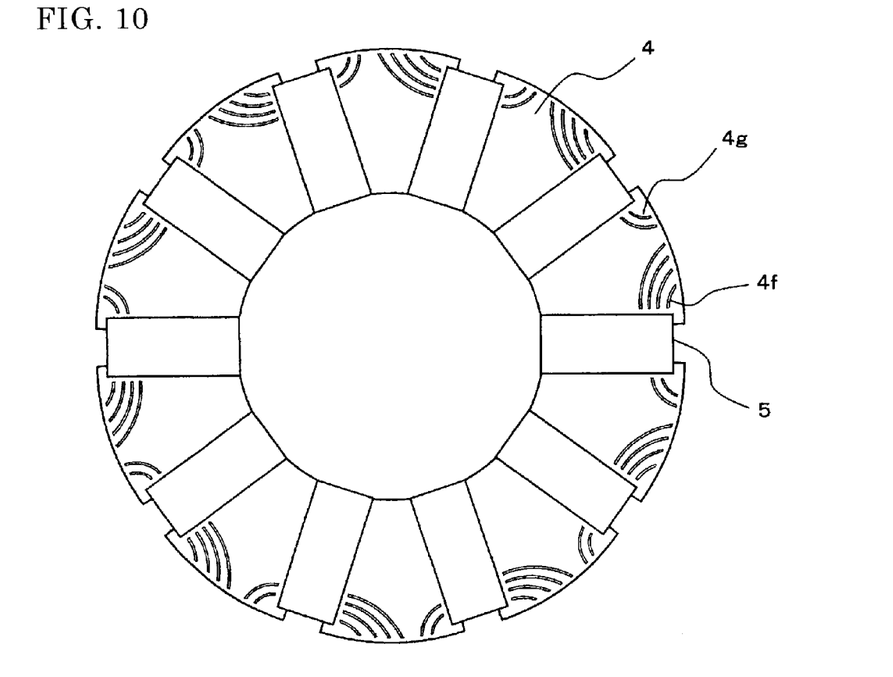
FIG. 10 is a sectional view of the rotor in the case where the number of voids forming a low permeability area of the rotor core is changed, in embodiment 1.

FIG. 10 is a sectional view of the rotor of the permanent-magnet-type rotating electric mechanism similar to FIG. 2.

Figure 11:
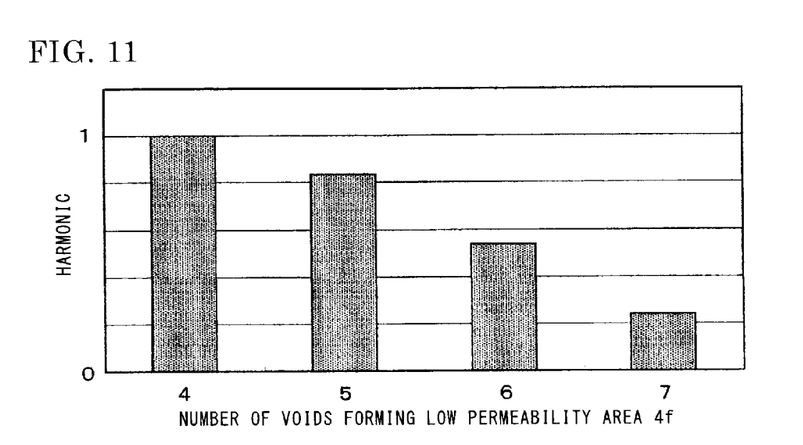
FIG. 11 is a diagram showing the relationship between the number of voids of the low permeability area and the magnitude of a harmonic in the rotor shown in FIG. 10.

In FIG. 10, as an example, the number of voids in one (4f) of low permeability areas formed asymmetrically is four, and the number of voids in the other one (4g) is two. FIG. 11 is a diagram showing the magnitude of a harmonic occurring when the rotor in FIG. 10 is rotated in a counter-clockwise direction in the case where the number of voids in the low permeability area 4f at a delayed side in the rotational direction is changed. A harmonic in the case where the number of voids in the low permeability area 4f is four is defined as 1.

From FIG. 11, it is found that a harmonic can be further reduced by further increasing the number of voids forming the low permeability area 4f from four. If a harmonic is reduced, torque ripple and iron loss can be reduced. Thus, increasing the number of voids is effective in terms of measure against harmonic. However, excessive increase in the number of voids causes a problem in terms of work and strength. Therefore, it is desirable to determine the number of voids in light of the size, capacity, usage condition, etc. of the rotating electric mechanism.

As described above, the permanent-magnet-type rotating electric mechanism of embodiment 1 includes a stator having stator windings wound on a plurality of tooth portions formed on a stator core, and a rotor having permanent magnets embedded between a plurality of magnetic poles formed along the circumferential direction of a rotor core, the rotor being rotatable integrally with a shaft. The rotor core has a low permeability area having lower permeability than that of a material of the rotor core, between the outer circumference of each magnetic pole and a side surface of each permanent magnet. The low permeability area is formed asymmetrically with respect to the geometric center in the circumferential direction of each magnetic pole so that the magnetic center of each magnetic pole is displaced toward one side with respect to the geometric center. Such rotor cores are placed upside down relative to each other so that the relative position in the circumferential direction of the low permeability areas with respect to the permanent magnets differs. Therefore, in an IPM rotating electric mechanism having an interior magnet structure, which generally has greater inductance than an SPM rotating electric mechanism having a surface magnet structure, q-axis inductance can be reduced owing to formation of the low permeability areas and reduction in an operation range due to constraint of power supply voltage can be suppressed. In addition, since the relative position in the circumferential direction of the low permeability areas differs, phases of cogging torque and torque ripple are shifted, whereby the same effect as in the case of skewing permanent magnets is obtained, and cogging torque and torque ripple can be reduced.

The permanent magnets are placed radially from the center side toward the outer circumference side of the rotor core. Therefore, the low permeability areas can be effectively provided in an IPM rotating electric mechanism, and an effect of reducing q-axis inductance is increased.

Two permanent magnets may be provided per one magnetic pole of the rotor core, and the two permanent magnets may be placed so as to spread in V shape from the center side toward the outer circumference side of the rotor core. Thus, the same effect as in the above can be obtained even in an IPM rotating electric mechanism having permanent magnets placed in V shape.

Each low permeability area is formed by a plurality of thin voids formed between the outer circumference of each magnetic pole of the rotor core and each side surface of the permanent magnets placed at both sides of the magnetic pole, and the number or the length of the voids is different between right and left with respect to the geometric center of each magnetic pole. Therefore, the low permeability areas can be easily and effectively formed with a die in manufacturing of the rotor core. In addition, a harmonic having a magnetic flux waveform generated from the surface of the rotor core can be reduced, and cogging torque and torque ripple can be further reduced.

Each low permeability area may be formed by a plurality of voids formed between the outer circumference of each magnetic pole of the rotor core and a side surface of one of the permanent magnets placed at both sides of the magnetic pole. In this case, as compared to the case of providing the low permeability areas at both sides, stiffness of the rotor is increased, and therefore the rotation rate can be increased.

Embodiment 2

Figure 12:
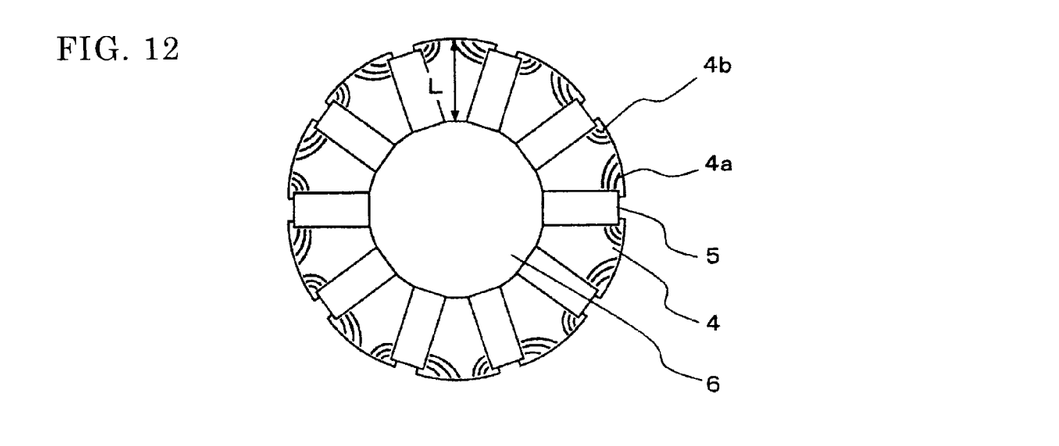
FIG. 12 is a sectional view of a rotor of a permanent-magnet-type rotating electric mechanism according to embodiment 2 of the present invention, along a direction perpendicular to the axial direction.
Figure 13:
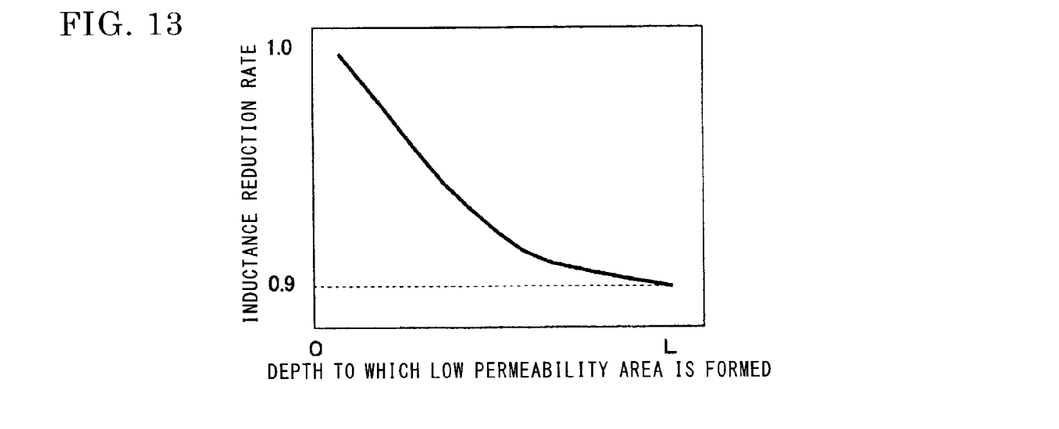
FIG. 13 is a diagram showing the relationship between an inductance reduction rate and a depth to which a low permeability area is formed, within a range up to a depth L in a radial direction of a rotor core shown in FIG. 12.
Figure 14:
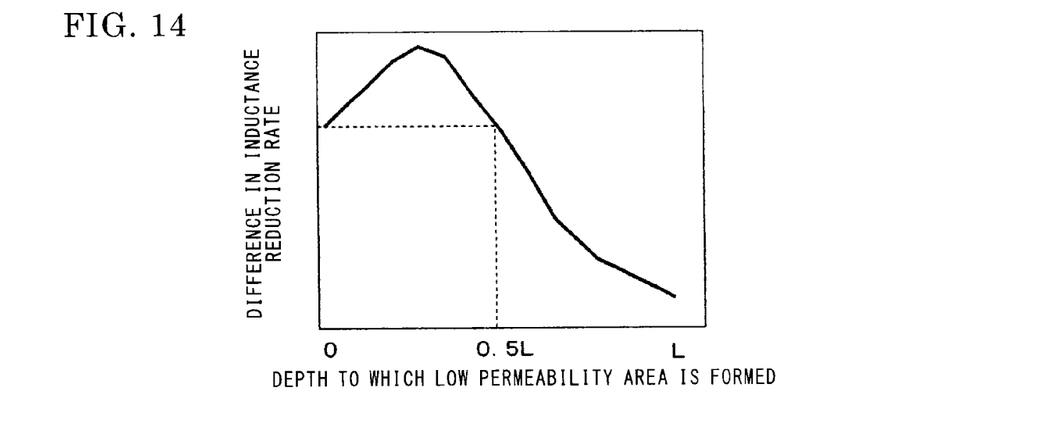
FIG. 14 is a diagram showing the relationship between a depth to which the low permeability area is formed and a difference in an inductance reduction rate, which is calculated from FIG. 13.

FIG. 12 is a sectional view of a rotor of a permanent-magnet-type rotating electric mechanism according to embodiment 2. The sectional shape of the entire permanent-magnet-type rotating electric mechanism is equal to that in FIG. 1 of embodiment 1, so the drawing and the description thereof are omitted. FIG. 13 is a diagram showing the relationship between a depth to which the low permeability area is formed and an inductance reduction rate in the present embodiment. FIG. 14 is a diagram showing the relationship between a depth to which the low permeability area is formed and a difference in the inductance reduction rate. The present embodiment relates to a range in which the low permeability area is formed in the rotor core 4.

In FIG. 12, L denotes a depth from the outer circumferential surface of the rotor core 4 toward the center side to the shaft.

FIG. 13 shows the relationship between a depth to which the low permeability areas 4a and 4b are formed and the inductance reduction rate, within a range up to the depth L from the outer circumferential surface of the rotor core 4. Here, L=0 indicates that no low permeability areas 4a and 4b are formed at all.

FIG. 14 shows a depth to which the low permeability area is formed and a difference in the inductance reduction rate, based on FIG. 13.

As shown in FIG. 13, from the outer circumference side toward the shaft side in the rotor core 4, the deeper the low permeability area is, the lower the inductance reduction rate is. Since a reduction effect is obtained, the more deeply the low permeability area is formed, the more the inductance is reduced. However, if the low permeability area is formed deeply, the strength of the rotor core 4 is reduced. Therefore, it is necessary to effectively reduce inductance without increasing the depth of the low permeability area more than necessary.

As shown by the relationship between a depth to which the low permeability area is formed and a difference in the inductance reduction rate in FIG. 14, the inductance can be most effectively reduced at a depth of about ¼ L. A position where the difference in the reduction rate has the same value as in the case where the low permeability area is formed near the outer circumference is at a depth of about ½ L.

From the above, it is effective that the depth to which the low permeability area is formed is set within ½ of the depth L from the outer circumferential surface of rotor toward the center side to the shaft.

As described above, in the permanent-magnet-type rotating electric mechanism of embodiment 2, in the case where L is a depth from the outer circumference of the stator core to the surface of the shaft, the low permeability area is formed within a range of ½ L from the outer circumference side. Therefore, while reduction in the strength of the rotor core is suppressed, the low permeability area can be effectively formed and the same effect as in embodiment 1 can be obtained.

Embodiment 3

Figure 15:
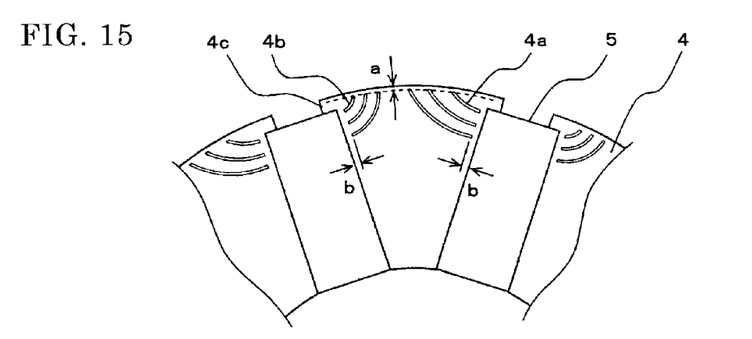
FIG. 15 is a partial sectional view of a rotor of a permanent-magnet-type rotating electric mechanism according to embodiment 3 of the present invention, along a direction perpendicular to the axial direction.

FIG. 15 is a partial sectional view of a rotor of a permanent-magnet-type rotating electric mechanism according to embodiment 3. The entire shape of the rotor is equal to that in FIG. 2 of embodiment 1, so the drawing and the description thereof are omitted. The present embodiment prescribes the position where the low permeability area is formed, in further detail.

As shown in FIG. 15, in a cross section perpendicular to the axial direction, a denotes a distance from the outer circumferential surface of the rotor core 4 to ends of the low permeability areas 4a and 4b (hereinafter, represented by 4a) that are close to the outer circumferential surface, and b denotes a distance from a side surface of the permanent magnet 5 (a longitudinal side of the rectangular sectional shape thereof) to an end, of the low permeability area 4a, that is close to the side surface.

Shortening the length a allows the low permeability area 4a to be lengthened, thereby providing an effect of reducing q-axis inductance. However, in the case of manufacturing the rotor core 4 with a die, normally, an electromagnetic steel sheet is stamped in the manufacturing. Therefore, it is necessary to secure the length so that the electromagnetic steel sheet is prevented from being distorted when stamped.

In view of the distortion, in the case where, for example, the rotor core 4 is manufactured with a general electromagnetic steel sheet having a thickness of 0.35 mm, it has been found that the length a may be set at 0.2 mm to 0.7 mm, depending on the way of making the die or the accuracy thereof.

On the other hand, the length b from a side surface of the permanent magnet 5 to the low permeability area 4a corresponds to the surface of the permanent magnet 5 that is in contact with the rotor core 4, and the surface is subjected to force from the permanent magnet 5 when the rotor 30 is rotated. In addition, since the nail portion 4c prevents the permanent magnet 5 from scattering by centrifugal force, great force is applied to the nail portion 4c. Therefore, if the length b is short, the strength of the rotor 30 is reduced. Therefore, it is necessary to lengthen the length b to an extent that an effect of reducing inductance is not lost.

In view of the above, it has been found that, if the length a is set within the above dimension and the length a and the length b are set to satisfy a<b, a structure that can reduce inductance while keeping a desired strength of the rotor can be obtained. In addition, it has been verified that, if the length b is set at about 3 mm or shorter, an effect of reducing inductance is hardly lost.

If the rotor strength is reduced, there is a possibility that the permanent magnets are scattered by centrifugal force, and therefore it is difficult to increase the rotation rate of the rotor. However, by employing the structure of embodiment 3, it becomes possible to increase the rotation rate of the rotor without reducing the strength of the rotor.

As described above, in the permanent-magnet-type rotating electric mechanism of embodiment 3, in the case where a is a distance from the outer circumferential surface of each magnetic pole of the rotor core to an end, of each low permeability area, that is close to the outer circumferential surface, and b is a distance from a side surface of each permanent magnet to an end, of each low permeability area, that is close to the side surface, a is set at 0.2 to 0.7 mm, and b is set to be longer than a but not longer than 3 mm.

Therefore, as well as providing the same effect as in embodiment 1, it is possible to increase the rotation rate while suppressing reduction in stiffness of the rotor due to formation of the low permeability areas.

During rotation of the motor, iron loss occurs in the rotor surface, due to change in permeance of slots. In order to reduce the iron loss to reduce flux leakage and improve output while keeping the strength, it is preferable to set the length a at 0.2 mm which is the minimum value, and to set the length b at about 0.35 mm which is equal to the sheet thickness, taking press stamping into consideration.

Embodiment 4

Figure 16:
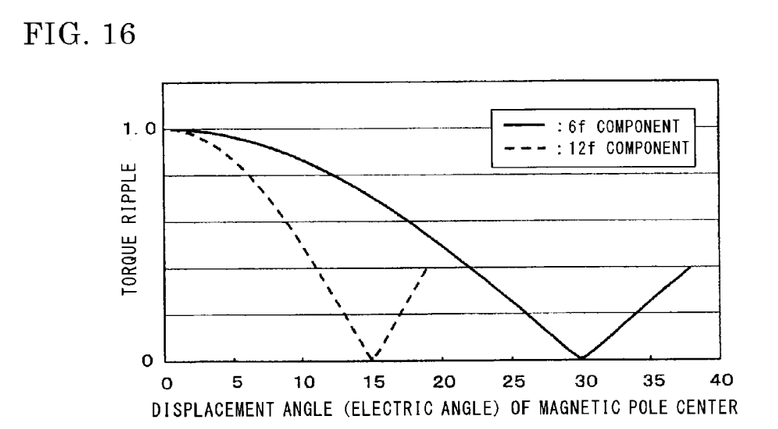
FIG. 16 is a diagram showing the relationship between torque ripple and an angle by which a magnetic pole center is displaced, in a rotor of a permanent-magnet-type rotating electric mechanism according to embodiment 4 of the present invention.

FIG. 16 is a diagram for explaining an effect of reducing a 6$f$ component and a 12$f$ component of torque ripple in a permanent-magnet-type rotating electric mechanism according to embodiment 4. The entire structure of the rotating electric mechanism is equal to that in FIG. 1, and the sectional view of a rotor is equal to those in FIG. 2, FIG. 7, FIG. 9, FIG. 10, etc., so the drawings and the description thereof are omitted. The present embodiment relates to an electric angle by which the magnetic center of each magnetic pole is displaced by formation of the low permeability areas.

A graph of torque ripple in FIG. 16 is a graph in an ideal state in which leakage of magnetic flux in the axial direction or the like does not occur. The magnitudes of a 6$f$ component and a 12$f$ component of torque ripple in a state in which the magnetic center of each magnetic pole is not displaced are defined as 1. It is noted that f is one electric cycle.

If the number of slots (=number of teeth) of the stator is denoted by Z (Z is a natural number), the number of phases is denoted by m, and the number of poles of the rotor is denoted by P (P is a natural number), a number q of slots per pole per phase is represented as q=Z/(m×P). A major component of magnitude of torque ripple occurring during driving differs depending on the value of q.

For example, in the case of the three-phase rotating electric mechanism as shown in FIG. 1, q=⅖, and a major component of torque ripple is a 12f component. In the case of q=½ or q=1, a major component of torque ripple is a 6f component.

Therefore, in the case where the magnetic center of each magnetic pole is displaced by means of low permeability areas as in the present invention, if the displacement angle is changed in accordance with the value of q, torque ripple can be reduced further effectively.

From FIG. 16, theoretically, in the case of q=⅖, if the magnetic pole center is displaced by an electric angle of 15 degrees in order to reduce a 12$f$ component, a major component of torque ripple can be reduced, and in the case of q=½ or q=1, i.e., q ≤½, if the magnetic pole center is displaced by an electric angle of 30 degrees in order to reduce a 6$f$ component, a major component of torque ripple can be reduced.

FIG. 16 shows an ideal state. Actually, due to influence of leaked magnetic flux and the like, the displacement angle varies depending on the length of the rotor core. This will be described below.

Figure 17:
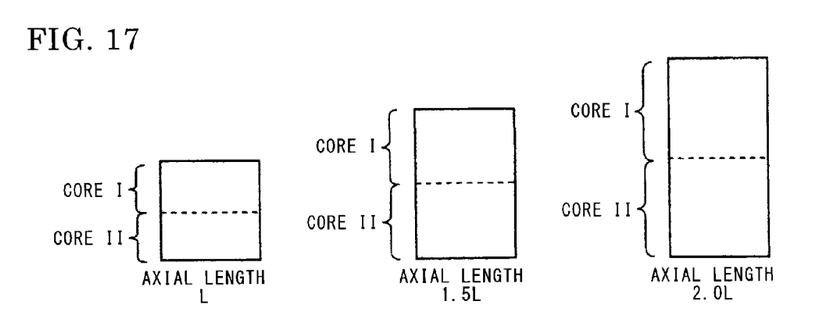
FIG. 17 is a diagram for explaining the case of changing the axial length of the rotor of the permanent-magnet-type rotating electric mechanism according to embodiment 4.
Figure 18:
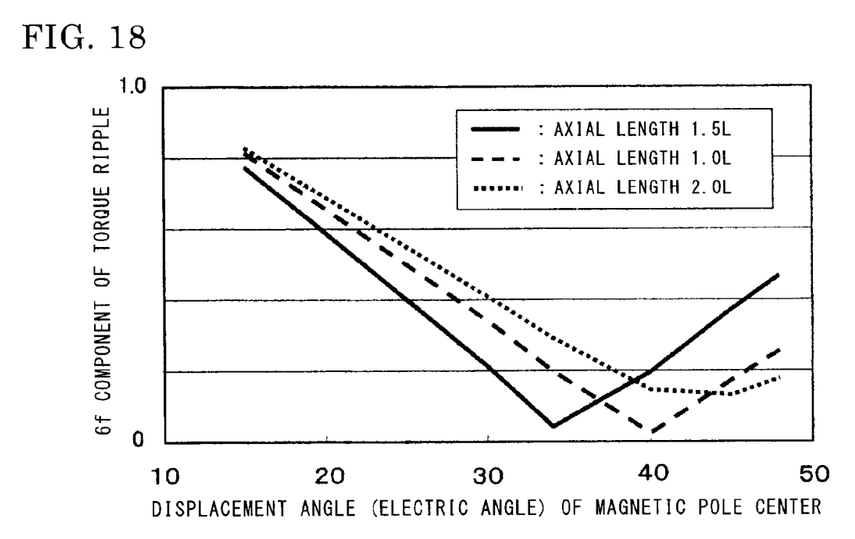
FIG. 18 is a diagram showing the relationship between a 6$f$ component of torque ripple and an angle by which a magnetic pole center is displaced, in each rotor in FIG. 17.

FIG. 17 is an axial-direction view showing models of rotor cores of the rotating electric mechanisms, which have different lengths, in the case of q=½. Each model has a combination of cores which are inverted from each other at the middle position in the axial direction. While an axial length L of a model in which the diameter and the axial length of the rotor are substantially equal is used as a reference, a total of three models having axial lengths L, 1.5 L, and 2 L are shown. FIG. 18 shows a 6$f$ component of torque ripple obtained in the case where the magnetic pole center is displaced in each model in FIG. 17.

In the case where the length of the rotor core of the rotating electric mechanism differs, torque ripple cannot be reduced in the same way even if the displacement angle of the magnetic pole center is the same. In the ideal state shown in FIG. 16, the displacement angle of the magnetic pole center that can most reduce a 6$f$ component of torque ripple is 30 degrees in the case of q=½. However, as shown in FIG. 18, actually, the displacement angle is shifted therefrom, and the shift amount varies also depending on the axial length. However, in any case, it is found that torque ripple can be further effectively reduced if the displacement angle is greater than 30 degrees.

In this regard, the same result is obtained also for a 12$f$ component of torque ripple. In the case of q=⅖, the displacement angle of the magnetic pole center in the ideal state shown in FIG. 16 is 15 degrees. If the displacement angle is greater than 15 degrees, torque ripple can be further effectively reduced.

From the above, in the case of q=⅖, if the displacement angle of the magnetic pole center is set to be greater than 15 degrees at which a 12$f$ component of torque ripple can be most reduced in an ideal state, torque ripple can be further effectively reduced, and in the case of q≤½, if the displacement angle of the magnetic pole center is set to be greater than 30 degrees at which a 6$f$ component of torque ripple can be most reduced in an ideal state, torque ripple can be further effectively reduced.

However, depending on the actual size or shape of the rotating electric mechanism, it is desirable to set an upper limit at about 50 degrees or smaller also in terms of manufacturing.

As described above, in the permanent-magnet-type rotating electric mechanism of embodiment 4, in the case where Z is the number of slots of the stator (Z is a natural number), P is the number of magnetic poles of the rotor (P is a natural number), m is the number of phases, and a number q of slots per pole per phase is represented as q=Z/(m×P), an electric angle by which the magnetic center is displaced with respect to the geometric center of each magnetic pole is, if q satisfies (⅖)≤q<(½), set at 15 degrees or greater, and if q satisfies (½)≤q, set at 30 degrees or greater. Thus, by changing the displacement angle of the magnetic center of each magnetic pole in accordance with a combination of the number of poles and the number of slots, cogging torque and torque ripple can be further effectively reduced.

Embodiment 5

Figure 19:
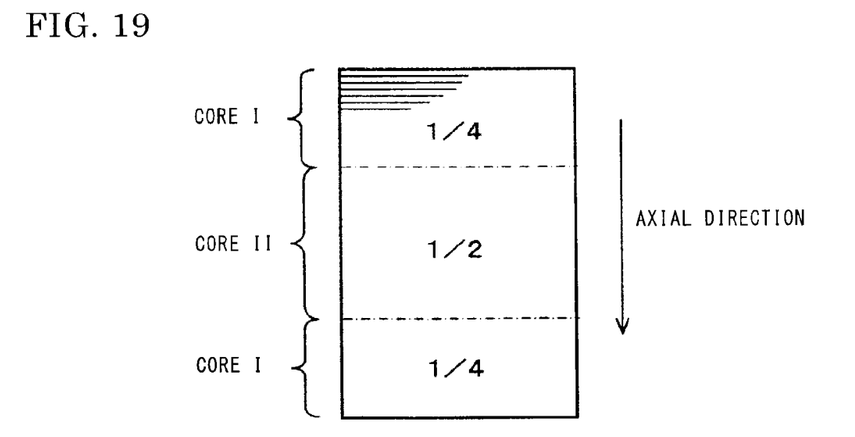
FIG. 19 is a view of a core I and a core II combined in the axial direction, of a rotor of a permanent-magnet-type rotating electric mechanism according to embodiment 5 of the present invention.

FIG. 19 is a plan view of a rotor core of a permanent-magnet-type rotating electric mechanism according to embodiment 5 of the present invention, as seen from a direction perpendicular to the axial direction. In the rotor core, the core I shown in FIG. 3 or FIG. 7 and the core II obtained by inverting the core I are used.

If the axial length of the entire rotor core is defined as 1, as shown in FIG. 19, a core I block with a length of ¼, a core II block with a length of ½, and then a core I block with a length of ¼ are combined in the axial direction, to form the entirety. A total axial length of core I blocks and a total axial length of core II blocks are equal to each other.

In the structure shown in FIG. 4 described in embodiment 1, the displacement directions of the magnetic centers of the magnetic poles in the core I and the core II are different between both axial end sides. Therefore, when load is applied, force in a thrust direction is applied, and a bearing or the like might be broken. On the other hand, in the present embodiment, the magnetic centers of the magnetic poles at one axial end side and the other axial end side are aligned at the same position. Therefore, thrust forces are cancelled, so that no thrust force occurs.

In FIG. 19, the cores I and the cores II include two inversions therebetween. However, they may include a larger number of inversions (which should be an even number).

As described above, in the permanent-magnet-type rotating electric mechanism of embodiment 5, the relative position in the circumferential direction of the low permeability areas is inverted depending on a position in the axial direction of the rotor, with the number of the inversions being an even number, so that the magnetic centers of the magnetic poles at one axial end side and the other axial end side of the rotor are aligned at the same position.

Therefore, thrust forces applied to the shaft of the rotor are cancelled, so that no thrust force occurs. Therefore, performance deterioration due to thrust force can be suppressed.

It is noted that, within the scope of the present invention, the above embodiments may be freely combined with each other, or each of the above embodiments may be modified or abbreviated as appropriate.

DESCRIPTION OF THE REFERENCE CHARACTERS

1 case, 2 stator core, 2a tooth portion, 3 stator winding, 4 rotor core, 4a, 4b, 4d, 4e, 4f, 4g low permeability area, 4c nail portion, 5 permanent magnet, 6 shaft, 10 rotating electric mechanism, 20 stator, 30 rotor

The invention claimed is:

1. A permanent-magnet-type rotating electric mechanism comprising:
    a stator having stator windings wound on a plurality of tooth portions formed on a stator core; and
    a rotor having permanent magnets embedded between a plurality of magnetic poles formed along a circumferential direction of a rotor core, the rotor being rotatable integrally with a shaft, wherein
    the rotor core has a plurality of low permeability areas each having lower permeability than that of a material of the rotor core, the low permeability areas are located between an outer circumference of each magnetic pole and a side surface of each permanent magnet,
    the low permeability areas are formed asymmetrically with respect to a geometric center in the circumferential direction of each magnetic pole so that a magnetic center of the magnetic pole is displaced toward one side with respect to the geometric center, and
    the rotor core includes two rotor core parts that are placed upside down relative to each other so that a relative position in the circumferential direction of the low permeability areas of the two rotor core parts with respect to the permanent magnets differs,
    wherein Z is a natural number of slots of the stator, P is a natural number of magnetic poles of the rotor, m is a number of phases, and a number q of slots per pole per phase is represented as $q=Z/(m \times P)$,
    the magnetic center is displaced by an electric angle with respect to the geometric center of each magnetic pole, and
    if q satisfies $(2/5) \leq q < (1/2)$, the electric angle is set at 15 degrees or greater, and if q satisfies $(1/2) \leq q$, the electric angle is set at 30 degrees or greater.

2. The permanent-magnet-type rotating electric mechanism according to claim 1, wherein the permanent magnets are placed radially from a center side toward an outer circumference side of the rotor core.

3. The permanent-magnet-type rotating electric mechanism according to claim 1, wherein
    the permanent magnets are provided two by two per one pole of the magnetic poles of the rotor core, and
    the two permanent magnets are placed so as to spread in V shape from a center side toward an outer circumference side of the rotor core.

4. The permanent-magnet-type rotating electric mechanism according to claim 2, wherein
    the low permeability area is formed by a plurality of thin voids formed between the outer circumference of each magnetic pole of the rotor core and each side surface of the permanent magnets placed at both sides of the magnetic pole, and
    a number or a length of the voids is different between right and left with respect to the geometric center of each magnetic pole.

5. The permanent-magnet-type rotating electric mechanism according to claim 2, wherein the low permeability area is formed by a plurality of thin voids formed between the outer circumference of each magnetic pole of the rotor core and a side surface of one of the permanent magnets placed at both sides of the magnetic pole.

6. The permanent-magnet-type rotating electric mechanism according to claim 1, wherein, in the case where L is a depth from an outer circumference of the stator core to a surface of the shaft, the low permeability area is formed within a range of 1/2L from the outer circumference side.

7. The permanent-magnet-type rotating electric mechanism according to claim 1, wherein, in the case where a is a distance from an outer circumferential surface of each magnetic pole of the rotor core to an end, of the low permeability area, that is close to the outer circumferential surface, and b is a distance from a side surface of each permanent magnet to an end, of the low permeability area, that is close to the side surface, a is set at 0.2 to 0.7 mm, and b is set to be longer than a but not longer than 3 mm.

8. The permanent-magnet-type rotating electric mechanism according to claim 1, wherein the relative position in the circumferential direction of the low permeability areas is inverted depending on a position in an axial direction of the rotor, with a number of the inversions being an even number, so that the magnetic centers of the magnetic poles at one axial end side and the other axial end side of the rotor are aligned at the same position.

\* \* \* \* \*